June 1, 1943. M. G. REES 2,320,470
CURRENT DELIVERING AND CONDUCTING MEANS
Filed April 11, 1938 2 Sheets-Sheet 1
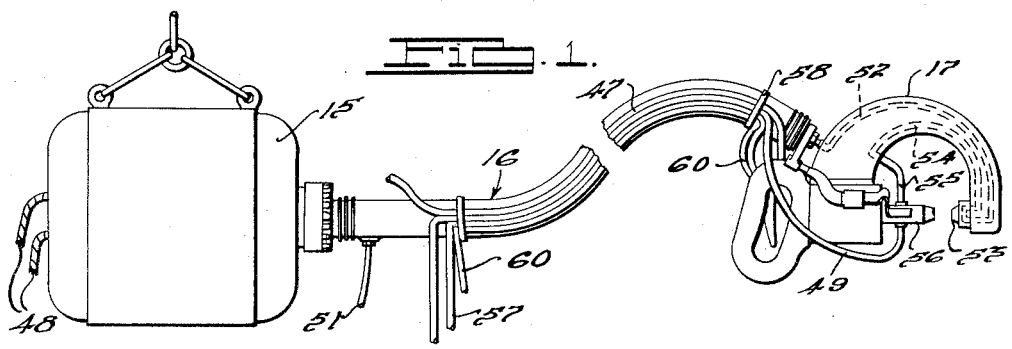
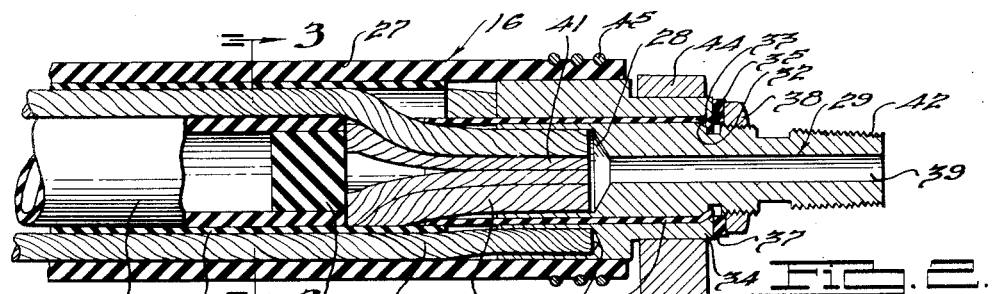
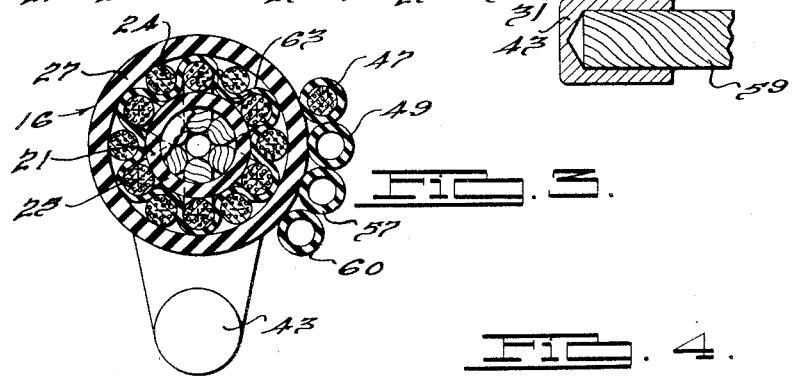
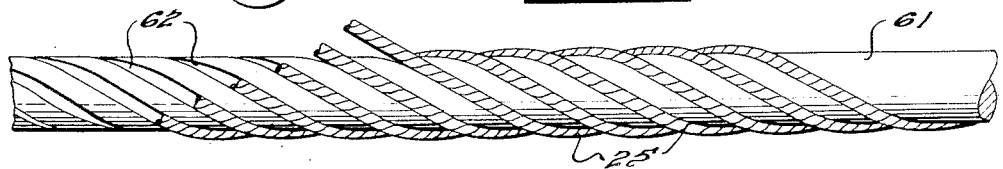
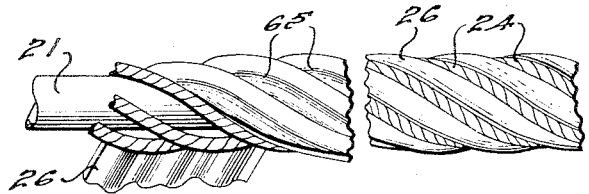
INVENTOR
Mackworth G. Rees.
BY
Harness, Dickey & Pierce.
ATTORNEYS.

June 1, 1943. M. G. REES 2,320,470
CURRENT DELIVERING AND CONDUCTING MEANS
Filed April 11, 1938 2 Sheets-Sheet 2
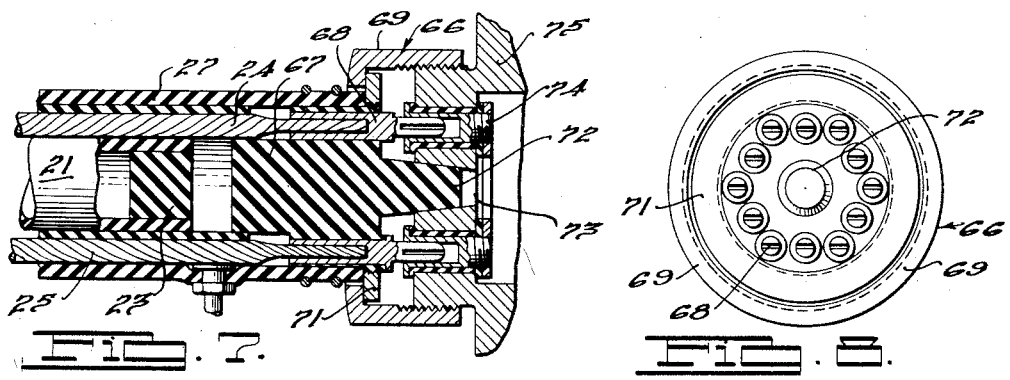
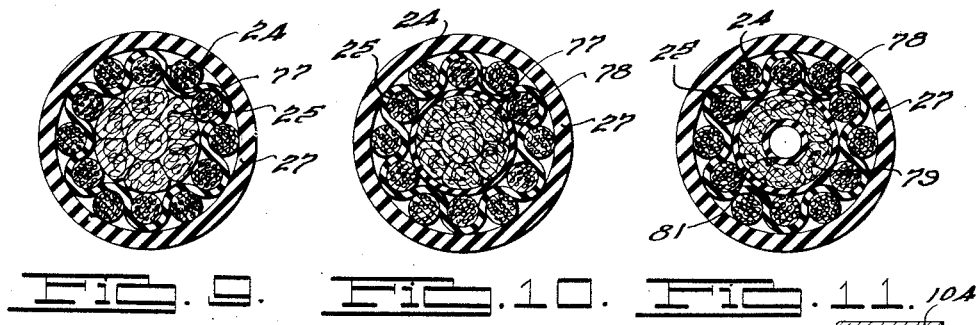
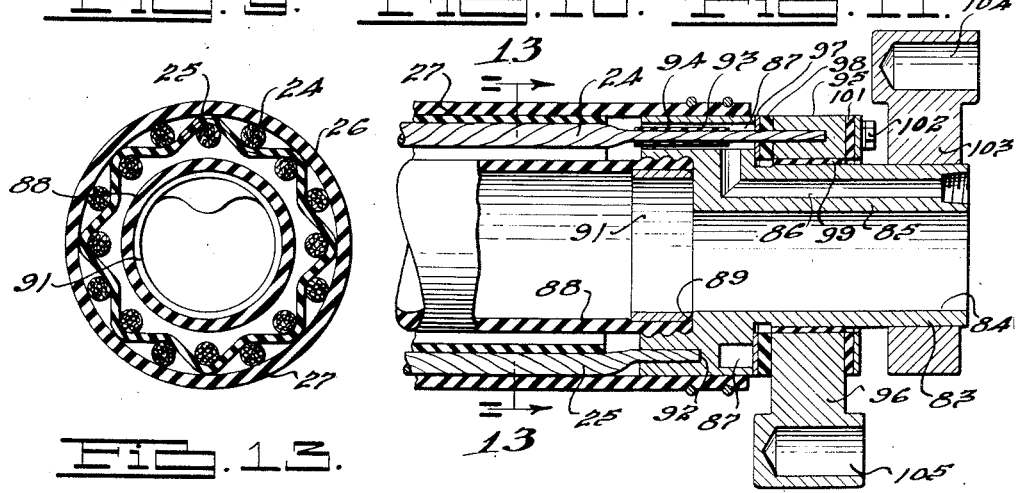
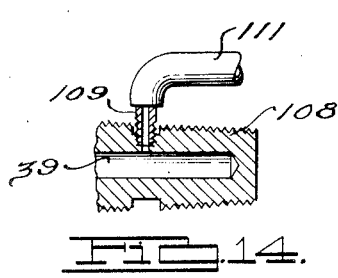
INVENTOR
Mackworth G. Rees.
BY
Harness, Dickey & Pierce
ATTORNEYS Patented June 1, 1943

2,320,470

UNITED STATES PATENT OFFICE 2,320,470

CURRENT DELIVERING AND CONDUCTING MEANS

Mackworth G. Rees, Detroit, Mich.

Application April 11, 1938, Serial No. 201,360

18 Claims. (Cl. 174—15)

My invention relates to current delivering sources and conductors, and particularly to a transformer and cable, separately and in combination, which is an improvement of the invention embodied in my Patent No. 2,247,133, issued June 24, 1941.

The above mentioned patent, of which the present application is an improvement, discloses a multi-conductor cable comprising pairs of leads having conductors disposed on the circumference of a circle for delivering current from a source to a load device, therein illustrated as a transformer and a welding gun. The individual conductors were insulated from each other, and a supply of cooling fluid, such as water, was conducted thereover to reduce the heating in the resulting cable. Flexible insulating sheaths were disposed interiorly and exteriorly of the cables to provide insulation, and a passageway for the cooling fluid. The cable, when employed separately or when connected directly to a multi-conductor transformer, provided materially greater efficiency over the use of a solid cable alone or in combination with a transformer having a single winding on the secondary. The power losses in the latter transformer secondary and in the solid conductors were large and comprised the ohmic drop which was the function of the resistance of the conductors and the current flowing, $E=I.R$. Eddy current losses and reactive volt drop were two additional losses which were present in this system. The latter two losses, the losses due to eddy current and reactive volt drop, were materially improved by the construction illustrated, described, and claimed in the above mentioned co-pending application.

The present application discloses the method of constructing the cable to provide flexibility thereto and the construction of the terminal ends by which the conductors of the cable are joined to the current source and a load device. The terminals of the cable may be similar at both ends or one end of the cable may have each of the conductors provided with a terminal which joins with a terminal of pairs of leads of a transformer having a plurality of individual windings forming the secondary. The opposite end of such a cable may have the conductors grouped and attached to a pair of terminals which connect with the load device.

The terminal preferably embodies a central conducting element to which one group of conductors of one lead may be soldered, brazed, or otherwise secured. This terminal is so constructed as to permit a second terminal to be concentrically disposed thereover to be joined to the remaining group of conductors to provide the two terminals of the other leads at the end of the cable. Suitable means is employed for insulating the two terminals from each other.

The central core about which the conductors are disposed may be a hollow element, such as a rubber hose, any type of flexible tube, or a light flexible solid core may be employed which may be of insulating material or impregnated or otherwise sheathed with insulating material. Such a flexible solid core could be a rope-like element having insulating material on its outer surface and in some instances could have a hollow tubular element extend through its body. On large cables the central core and end terminal may be hollow to permit the various operating circuits to the load device to extend therethrough. Such operating circuits would be, the electric control circuit, the power means for operating the load device, and fluid conductors for delivering a cooling fluid thereto.

To provide the desired flexibility to the resulting cable, the conductors made of fine strands, are twisted and wound helically so that the resulting plurality of conductors will retain the form of a helix after the cable is assembled in final form.

Accordingly, the main objects of my invention are: to provide a source of current and a cable embodying a pair of leads having a plurality of conductors alternately disposed on the circumference of a circle; to provide a source of current and a cable, both of which have a plurality of positive and negative conductors, with terminals by which the cable may be separated from the current source; to provide a cable with a pair of leads having a plurality of conductors which are provided with a predetermined twist to have the conductors helically disposed relative to the terminal ends of the cable; to form a cable by twisting a plurality of conductors and winding them spirally on a mandrel and connecting the ends to a terminal; to provide a flexible insulating cover for a plurality of conductors which are sealed to terminals provided on the ends thereof; to helically wind groups of conductors of a pair of leads and material for insulating the conductors which are grouped at the cable ends and connected to terminals; to provide a pair of terminals at the ends of a multiple conductor cable, which are concentrically disposed relative to each other; to provide a flexible central core for a cable which may be of solid or of hollow construction having a thin or heavy wall which is made of insulating material and about which the conductors are disposed; to provide hollow terminals for the ends of the cable having a hollow core to provide an aperture entirely through the cable and terminals; and in general, to provide a current source and conductor in combination or separately, which materially reduces the losses when supplying current to a load device.

Other objects and features of novelty of my invention will be either specifically pointed out or will become apparent when referring, for a better understanding of my invention to the following description taken in conjunction with the accompanying drawings, wherein:

Figure 1 is a broken view in elevation of a current source and load device interconnected by a cable embodying features of my invention;

Fig. 2 is an enlarged sectional view of one end of the cable, illustrated in Fig. 1;

Fig. 3 is a sectional view of structure illustrated in Fig. 2, taken on the line 3—3 thereof;

Fig. 4 is a view showing one method which may be employed in the manufacture of the cable illustrated in the foregoing figures;

Fig. 5 is a view of structure, similar to that shown in Fig. 4, with insulating material wound about the cables;

Fig. 6 is a view of structure, similar to that illustrated in Fig. 5, with additional conductors wound on the insulating material;

Fig. 7 is an enlarged broken sectional view of the opposite end of the cable illustrated in Fig. 1, including a portion of the transformer;

Fig. 8 is an end view of the cable illustrated in Fig. 7, when disconnected from the transformer terminals;

Fig. 9 is a view of structure, similar to that illustrated in Fig. 3, showing a modified form thereof;

Fig. 10 is a view of structure, similar to that illustrated in Fig. 9, showing a further form which my invention may assume;

Fig. 11 is a view of structure, similar to that illustrated in Fig. 10, showing a still further form of my invention;

Fig. 12 is a sectional view of the structure similar to that shown in Fig. 2, showing a modified form thereof;

Fig. 13 is a sectional view of the structure illustrated in Fig. 12, taken on the line 13—13 thereof; and, Fig. 14 is a broken view of structure similar to that illustrated in Fig. 2 showing a modified form thereof.

In Fig. 1, I have illustrated a current source 15, herein illustrated as a transformer, preferably of the ring type having a plurality of secondaries, each of which is provided with a positive and a negative conducting end. The conducting ends of the secondaries are connected to positive and negative terminals which are alternately disposed on the circumference of a circle. A cable 16 is constructed of a plurality of conductors, one end of which is connected to independent terminals which join with the terminals of the transformer, the other end of which is provided with a single pair of terminals. The pair of terminals at the opposite end of the cable from the transformer, are connected to a load device 17, herein illustrated as a portable welding gun of conventional type.

The efficiency of the device is materially increased by reducing the losses in the transformer and in the conductor provided between the transformer and the gun. Some commercial portable welding devices are so inefficiently designed as to require an open circuit voltage of 25 volts to deliver two volts to the welding electrodes. Devices requiring an open circuit voltage of from 12 to 15 volts to produce two volts across the electrodes are the most efficient devices commonly employed today. With my transformer and conductor, an open circuit voltage of 8 volts will deliver as high as 2.4 volts to the welding electrodes.

It is known that the leakage flux, caused by the loose coupling between the primary and secondary windings, will be greater with a single secondary turn wrapped around the primary winding than it will be if the secondary is wound in sections interspaced between sections of the primary. Accordingly, by increasing the number of secondary sections I greatly reduce the leakage flux and materially improve the power factor. The transformer having the plurality of secondary and primary windings has a better regulation than transformers having a single turn secondary and a single primary winding.

With the improved transformer, I employ a cable embodying a pair of leads each having a plurality of light conductors arranged annularly, in parallel relation with the conductors of different leads alternatingly disposed and indicated as conductor A. Tests were conducted on various types of cables, employed in combination with my above described transformer. Two parallel conductors such as commonly employed, and indicated as conductor B, and a pair of leads embodying a plurality of conductors which were grouped in alternate arrangement to form a solid cable, and indicated as conductor C, were compared with the conductor A. Readings were taken when test welds were made with the various cables, employed in connection with the "ring" transformer above described. The results were as follows:

|  | Conductor B | Conductor C | Conductor A |
|---|---|---|---|
| Primary input amperes | 280 | 260 | 240 |
| Volts at weld | .8 | 1.8 | 2.4 |
| Open circuit volts | 8 | 8 | 8 |
| Reactive volt drop in leads and secondary | 3.6 | 2.8 | 2.0 |
| Ohmic drop in leads | 3.6 | 3.6 | 3.6 |
| Condition of weld | No weld | Fair | Good |

The duration of the attempted welds was 4 cycles on a 60 cycle current requiring approximately 1/15 of a second. However, greater or less time may be employed in practice. Readings were taken by recording the swing of the instruments, which, while not of the highest accuracy, were comparative. The actual results above indicated checked very favorably with the values to be expected from computations made from standard tables of reactance volts in parallel conductors.

Such computation was made from table 27, page 1657 (Mershon diagram) Mechanical Engineers Handbook (McGraw, Hill Book Company, Inc.) first edition 1916 Lionel E. Marks, editor-in-chief. Employing the facts in the table and assuming 6,000 amperes in the secondary conductor comparison may be made between the use of the standard 500,000 circular mill cable in a pair of conductors and the employment of 8 conductors of 66,370 circular mills, the plurality of which totals more than 520,000 circular mills. In the comparison, it is assumed that the cables are 6 feet long, one for a lead and one for a return, and the transformer secondary is selected as approximately two feet long, making a total length of 14 feet. The following results were obtained by computation:

Ohmic drop 500,000 c. m. 1 cable $$\frac{.042 \times 14 \times 6000}{2000} = 1.764 \text{ volts}$$

Reactive drop 500,000 c. m. 2" centres $$\frac{.90 \times 14 \times 6000}{2000} = 3.78 \text{ volts}$$

Total ohmic and reactive drop to be added vectorally.

Ohmic drop 8-#2 in parallel $$\frac{.312 \times 14 \times 6000}{2000 \times 8} = 1.64 \text{ volts}$$

Reactive drop on ¼" centres $$\frac{.074 \times 14 \times 6000}{2000 \times 8} = .376 \text{ volt}$$

From the above, it is readily seen that the reactive volt drop can be reduced approximately 3.4 volts or to 10% of its original value. The eddy current losses were not measured but it is known that these were reduced automatically by the arrangement of the cables reducing the reactive volt drop. In actual tests as set out above, with an open circuit secondary voltage of 8 volts, 2.4 volts was delivered through the cable, illustrated in Fig. 2, to the welding electrodes and exceptionally good welds were produced. When the standard form of cables were employed, there was no welding of the material. This disclosed the increased efficiency of the conductor illustrated in Fig. 2 when employed in combination with my above described sectionalized transformer for producing resistance welds. This increase in efficiency is of great advantage particularly in portable welding devices since a decrease in the weight of the device and an increase in cable length may be had. Portable welding devices are now being utilized commercially for welding within the interior of automobile bodies, busses, trucks, railway coaches, and the like. When exterior welding only was employed, the short cables and heavy equipment could be utilized without experiencing great fatigue. In producing welds on the interior of a structure, the apparatus must be exceptionally mobile and efficient. I not only have increased the portability of my welding device but have also increased its efficiency which permits the employment of longer or lighter conductors. When an efficiency equal to that of the present welding devices is satisfactory, I increase the portability of my device materially by reducing the weight and diameter of the cable employed. By employing a cable as herein illustrated and described, I am not limited to short cable lengths and may therefore produce welds with a single gun at points spaced much farther apart than is the present practice.

The number of conductors employed in the cable 16 depends upon the amount of current delivered by the secondary. I preferably employ the 66,370 circular mill conductor referred to above since the reactive volt drop in this size is negligible. It is to be understood that conductors of smaller or greater diameter could be employed in the cable. However, I found this size to have a satisfactory current carrying capacity and I select the number of conductors to be employed to correspond to the amount of current to be carried.

Referring more particularly to Figs. 2 to 6, I have illustrated the cable 16 in detail, and the method by which the cable is constructed. The cable embodies a central core 21 which is herein illustrated as a hollow flexible tube of insulating material which may be provided with blocks 23 at spaced points to prevent its collapse. The block 23 is herein illustrated as being solid, but it is to be understood that it may have an aperture therein to form a conduit through the center of the core 21.

About the core a plurality of conductors 24 of one lead and a plurality of conductors 25 of another lead are alternately disposed concentrically about the core 21. An insulating sheath 26, which may be corrugated in form, interwinds between the conductors 24 and 25 to insulate the conductors from each other. An outer flexible sheath 27 of insulating material encompasses the core, conductors, and sheath to form the unit cable.

In Fig. 2, I have illustrated the conductors 25 of one lead as being grouped at the end of the cable and welded, soldered, brazed or otherwise secured within an aperture 28 of a central terminal 29. A removable rod to which the solder or brazing material does not adhere may be employed centrally of the conductors, to provide a central aperture through the cables in continuation of the aperture 28. A central tube could also be employed to provide such an aperture through the grouped ends of the conductors. A tubular insulating member 31 is disposed over the terminal 29 to project within the sheath 26 to completely insulate the conductors 25 from the conductors 24. A beveled shoulder 32 may be provided on the terminal 29 and the outer end of the insulating tube 31 has a sloping conical end 33 for positioning the tube relative to the terminal. Over the insulating tube 31 a terminal 34 is disposed concentric to the terminal 29. A beveled shoulder 35 is provided on the inner wall of the terminal 34 for engagement with the sloping end 33 of the insulating tube 31. A plurality of concentrically disposed apertures 36 are provided in the inner wall of the terminal 34 in which the ends of the conductors 24 are disposed and soldered, brazed, or otherwise secured. An insulating washer 37 is clamped against the outer face of the terminal 34 by a clamping nut 38 which is screwed upon the terminal 29. The terminals are clamped together through the engagement of the sloping shoulder 35 with the end 33 of the insulated tube 31 and the beveled shoulder of the terminal 29.

The terminal 29 has a central aperture 39 through which water may be conducted to or from the central opening 41 through the grouped ends of the conductors 25 to flow about the conductors 24 and 25 along the length of the cable. The end of the terminal 29 may be threaded at 42 for the purpose of attaching the cable to a load device such as the welding gun 17 above referred to. A removable terminal 43 having an adjustable collar 44 is clamped upon the terminal 34 and provides means for connecting the other conductors to the device. The outer flexible sheath 27 projects over the body of the terminal 34 and is sealed thereto by suitable clamping means herein illustrated as by a plurality of clamping wires 45. Supply conductors employed for controlling the energization of the transformer, for conducting water to and from the load device and for operating a movable element of the device, are herein disclosed as being attached to the side of the cable readily accessible for repair.

In Fig. 3 I have illustrated a cable 47 joined to a contactor (not shown) which closes the transformer circuit through the conductors 48 thereof. A hollow flexible conduit 49 is disposed adjacent to the conductor 47 for completing the cooling fluid circuit through the conduit and load device. The fluid is preferably introduced into the conduit 49 from which it will flow to the movable electrode 56 then through a flexible conduit 55, aperture 54 to a point adjacent the stationary electrode 53 of the welding gun 17, from which it passes through an aperture 52 to the terminal 29. The fluid then passes through the terminal along the conductors 24 and 25 and then out through a nipple in the wall of the casing 27 through the tube 51. It is to be understood that a reverse flow of coolant could be provided, but it is believed that the flow from the gun to the cable is most desirable since it would eliminate the possibility of portions of the cable assembly from becoming loose and carried into the apertures of the gun where clogging may occur.

Additional tubes 57 and 60 are disposed adjacent the conduit 49 enclosing the actuating medium employed for operating the electrode 56 toward the electrode 53. While such elements 47, 49, and 57, are shown attached to the side of the cable, it is to be understood that when a hollow cable and terminals are employed the elements may pass through the center of the cable and terminals to be completely enclosed thereby. Any means may be provided for clamping the elements on the sheath of the cable and for the purpose of illustration, I have shown clamping bands 58 encircling the cable and the adjacent conduits. The tube 60 may be utilized when a fluid pressure is employed for actuating the electrode 56 to operate the contactor when sufficient pressure has been built up for operating the electrode.

The terminal 29 of the cable is screwed into the body of the gun to have the central aperture 39 thereof communicate with the aperture 52 in the body. The projecting terminal 43 on the cable terminal 34 carries a shunt 59 which is soldered, or otherwise secured to the movable electrode 56. In this manner the conductors of both leads are connected to the movable and stationary electrodes 56 and 53, respectively.

As pointed out hereinabove, the conductors 24 and 25 are disposed on a helix relative to the axis of the resulting cable to provide flexibility thereto. When each conductor is provided with a predetermined twist when assembled on the terminals 29 and 34, the conductors will at all times retain their helical relation to the cable axis. A predetermined twist may be provided to each of the conductors sufficient to cause the conductors to assume their helical shape after they are assembled in their respective terminals. A preferred method of providing the right degree of twist to each conductor to have them conform to the shape of a helix embodies the use of a mandrel 61 which may be made of wood or other material having slots 62 therein disposed in helical paths. The diameter of the mandrel across the base of the slot 62 is preferably equal to that of the core 21 above referred to. By winding the conductors in the slots 62 on the mandrel, the conductors will assume the form of the helix naturally and will retain such form after the mandrel is removed. The mandrel is thereafter twisted out of the conductors and the core 21 is disposed within the conductors in place of the mandrel.

When constructing the cable as illustrated in Fig. 2, the negative conductors 25 are first wound on the mandrel as specified above, and a sheath 26 of corrugated form is wound upon the conductors 25. The sheath may be a strip of material which may be spirally wound upon the conductors with the side edges in overlapping relation. When the corrugations in the sheath are disposed parallel to the lengths thereof and the sheath is positioned at an angle to the core 21 to have the corrugations follow the helix of the conductors 25, the side edges of the sheath overlap a sufficient amount to assure insulation, such overlapping being illustrated at 63 in Fig. 3. The downwardly presenting portions of the corrugations encompass the conductors 25 while the upwardly presenting portions of the corrugations provided therebetween provide grooves in which the conductors 24 may be wound in the same manner as the conductors 25 were wound in the slots 62 of the mandrel 61. In Fig. 6, I have illustrated such a disposition of the conductors 24 in the upwardly presented corrugations 65 of the sheath.

After the conductors 24 are wound within the corrugations 65 of the sheath 26 the outer sheath 27 is then slid over the sheath 26 and wires 24 as illustrated in the figure. After the conductors 25 are helically disposed on the core 21, an axially disposed electrode 29 is soldered, brazed, or otherwise secured to the grouped ends of the conductors 25. After the conductors 24 are wound in the corrugations 65 as illustrated in Fig. 6, the outer terminal 34 is secured to the ends of the conductors 24. The outer sheath 27 is slid over the sheath 26, the conductors 24, and the terminal 34, to the latter of which it is sealed by suitable clamping means.

Referring to Fig. 7, I have illustrated the multiple terminal connector 66 on the transformer end of the cable, in section. A head 67 of insulating material has molded therein a plurality of projecting metal terminals 68 to which the ends of the conductors 24 and 25 are secured. The ends are preferably reduced in diameter under pressure and are inserted in recesses in the terminals and soldered, brazed, or otherwise secured therein. A clamping nut 69 is disposed over the outer sheath 27 in position to engage a washer 71 which is threaded or otherwise secured to the insulating head 67. A central conical projection 72 is axially disposed relative to the cable mateable with a conical recess 73 in the transformer portion of the terminal casing for accurately aligning the terminals thereof.

Recessed terminals 74 are mounted on the transformer in alignment with the terminals 68 of the cable which project thereinto when the cable is joined to the transformer and retained thereon by the threading of the nut 69 on the threaded projection of the body portion 75 of the transformer. It is to be understood that the ends of the pair of leads of the secondary windings of the transformer are adjacently disposed and connected to pairs of the terminals 74, the number of terminals being the same as the number of conductors 24 and 25 provided in the cable.

When a transformer is employed having a single secondary winding with a single pair of terminals, then the cable may be constructed at both ends with a single terminal for each lead as illustrated in Fig. 2. When so constructing the transformer and cable, the central terminal 29 connected to the transformer may be made solid to prevent the flow of the cooling medium into the transformer proper. When the connection of the transformer is solid, both of the terminals 29 may be provided with the aperture 39 to have similar terminal ends, the solid electrode of the transformer preventing the flow of the coolant thereinto.

In Figs. 9, 10, and 11, I have illustrated modified forms of cores 21 which may be employed with my improved cable. In Fig. 9, I have illustrated a central core 77 which may be a rope of cotton, hemp, or the like which is flexible and about which the conductors 24 and 25 may be disposed. It is within the purview of my invention to impregnate such a rope to have it impervious to moisture, and in Fig. 10, I have illustrated the rope encased in a thin rubber tube 78 which may be drawn thereover or which may be vulcanized directly thereon.

In Fig. 11, I have illustrated a rope 79 having a central tubular conduit 81 and an outer insulating sheath 78. The central conduit 81 may be employed in place of any one of the conduits secured to the outside of the cable illustrated in Fig. 2 for attachment to the load device. Any type of core known in the art to be suitable may be employed in place of those shown and described as being desirable for retaining the conductors 24 and 25 in annular position within the sheath 27.

In Figs. 12 and 13, I have shown a further form of my invention, that wherein the cable and associated terminal are hollow to permit the elements 47, 49, and 57 to pass therethrough. In this arrangement, a central terminal 83 is provided with an opening 84 having a thick wall portion 85 through which an aperture 86 is provided for conducting the cooling medium therethrough into annular recesses 87 in the outer shoulder portion of the terminal communicating therewith. An inner core 88, herein illustrated as a rubber tube, is clamped within a recess 89 of the terminal by a clamping ring 91. The ring is forced within the tube and after the end of the tube is disposed within the recess 89 the material of the tube will be squeezed against the wall of the recess by the ring when the ring is drawn outwardly of the tube to a position opposite said wall. The conductors 24 and 25 are disposed in helical paths about the core 88 and are separated by a sheath 26 in a manner as hereinabove described. The terminal 83 is provided with alternate apertures 92 and 93, the former of which receives the compressed ends of the conductors 25 which are soldered, brazed, or otherwise secured thereto. The apertures 93 extend entirely through the base of the terminal 83 permitting the ends of the conductors 24 to project therethrough. The conductor ends are compressed to reduce their diameter for receiving the tubes 94 which insulate the conductor from the terminal. The conductors 24 extend into apertures in a ring 95 of a terminal 96, being soldered, brazed or otherwise secured therein, after a sealing gasket 97 and an insulating washer 98 is disposed between the ring 95 and the base of the terminal 83. An insulating sleeve 99 separates the ring 95 from the terminal 83 and an insulated washer 101 is placed upon the outer face of the ring to completely insulate the ring 95 from the terminal 82. A plurality of bolts 102 extend through the ring 101 threaded into the terminal 83 at points substantially aligned with the conductors 25.

A terminal 103 may be provided on the terminal 83 having a recess 104 therein, similar to the recess 105 provided in the terminal 96 employed for the purpose of forming a connection to the load device. The conductors 25 are connected directly to the terminal 83 while the conductors 24 extend through the base of the terminal and are joined to the ring 95 of the terminal 96. Water entering the aperture 86 may flow about the annular channel 87 in the terminal and pass downwardly about the ends of the conductors 24 and 25 of the cable. The inner core 88 provides an aperture entirely through the cable in which a plurality of conduits or operating elements for the load device may be disposed extending from the openings in the terminals 83.

It is to be understood that one end of the cable may have a plurality of terminals 68 provided therein to form a connection similar to that illustrated in Figs. 7 and 8, whereby the cable may be connected to a source, a load, or to another cable without the necessity of grouping the conductors as occurs when a single terminal for each lead is employed. It may be advantageous to provide the ends of the cable with recessed and projecting terminals 74 and 68, respectively, so that sections of cables may be joined together while maintaining the conductors continuous without being grouped. Cables having the multiple pairs of terminals at the ends may be employed for interconnecting a source to a load device when it is desirable to entirely eliminate any grouping of the conductors thereof.

In Fig. 14 I have illustrated a modified form of terminal end, wherein a terminal 108 is similar to terminal 29, with the exception that the aperture 39 thereof terminates short of the end thereof. From the side of the terminal an aperture communicates with the aperture 39 having a nipple 109 thereon to which a conduit 111 may be attached to be connected to the aperture 57 of the welding gun. In some arrangements it is advantageous to conduct the cooling medium through the conducting element 111 rather than through the end of the terminal 29.

While I have described and illustrated several embodiments of my invention, it will be apparent to those skilled in the art, that various changes, omissions, additions and substitutions may be made therein without departing from the spirit and scope of my invention, as set forth in the accompanying claims.

What I claim is:

1. A cable embodying a pair of leads, each lead having a plurality of conductors alternately disposed on the surface of a cylinder with relation to the conductors of the other lead, one end of said cable having a terminal for each of the conductors of both leads, and means for insulating the terminals and conductors of one lead from those of the other lead.

2. A cable having a pair of leads, each lead embodying a plurality of conductors alternately disposed on the surface of a cylinder with relation to the conductors of the other lead, one end of said cable having a terminal for each of the conductors of both loads, means for insulating said terminals of one lead from those of the other, and a pair of co-axially disposed terminals for the other end of the cable to which the opposite ends of the conductors of the two leads are grouped and respectively joined.

3. A cable embodying a plurality of conductors forming one lead, a terminal to which one end of the conductors is joined, a plurality of conductors forming a second lead, each conductor of said second lead being disposed between a pair of conductors of said first lead, all of which are disposed on the surface of a cylinder, a second terminal in telescoping relation with said first terminal, the same ends of the conductors of said second lead being disposed on the surface of a smaller cylinder and joined to said second terminal, means for insulating said conductors from each other, and means independent of said insulating means for insulating said terminals from each other.

4. A cable embodying a plurality of conductors forming one lead, a terminal to which one end of the conductors is joined, a plurality of conductors forming a second lead, each conductor of said second lead being disposed between a pair of conductors of said first lead all of which are disposed on the surface of a cylinder, a second terminal coaxial with said first terminal, the same ends of the conductors of said second lead being disposed on the surface of a smaller cylinder and joined to said second terminal, and means for insulating said conductors from each other while exposing a large portion of the surface thereof, one of said terminals having a passageway for a coolant communicating with all of said conductors.

5. A cable formed of a pair of leads each comprising a plurality of conductors, with the conductors of one lead alternately disposed with relation to those of the other lead on the surface of a cylinder, co-axial terminals at the ends of the cables to which the leads are joined, said conductor being composed of a plurality of strands, each conductor being twisted about its axis to have the conductors as a group assume the form of a helix which provides flexibility to the resulting cable when each conductor is retained twisted by said terminals.

6. A cable formed of a pair of leads each comprising a plurality of bare conductors, with the conductors of one lead, alternately disposed with relation to those of the other lead on the surface of a cylinder, co-axial terminals at the ends of the cables to which the leads are joined, said conductor being composed of a plurality of strands, each conductor being twisted about its axis and retained in twisted position by said terminals to have the bare conductors assume the form of a helix which provides flexibility to the resulting cable, one of said terminals having a passageway for a coolant communicating with said bare conductors.

7. A cable including, in combination, an outer and inner insulating element, two leads each embodying a plurality of conductors with the conductors of one lead alternately disposed with relation to the conductors of the other lead between said elements, means for insulating said leads from each other and forming passageways about each of the conductors for a coolant, one end of said cable having coaxially disposed terminals to which the conductors of the leads are respectively joined, means independent of said inner and outer insulating element for insulating said terminals from each other, one of said terminals having a passageway through which the coolant is conducted to said first passageways.

8. A cable having a pair of leads, each lead embodying a plurality of bare conductors, the conductors of one lead being disposed between a pair of conductors of the other lead, insulating means separating said conductors from each other while retaining a greater portion of their surfaces exposed, means for confiningly conducting a cooling fluid over said exposed surfaces, a single terminal to which a set of conductors of one lead after being bent inwardly toward the cable axis and grouped are conductively joined, a second terminal co-axially disposed with relation to said first terminal to which said other group of conductors are extended and joined, and means independent of said insulating means for insulating said terminals.

9. A cable for transmitting heavy current which includes a pair of leads comprising a plurality of bare flexible conductors disposed on the surface of a cylinder, each conductor of one lead being disposed between a pair of conductors of the other lead, a sheet of corrugated insulating material helically interwoven between individual conductors and insulating them from each other, said conductors of the different leads being grouped into respective leads at the terminal end of the cable.

10. A cable for transmitting heavy current which includes a pair of leads each embodying a plurality of bare flexible conductors disposed on the surface of a cylinder, each conductor of one lead being disposed between a pair of conductors of the other lead, an insulating sheet helically disposed between and insulating said individual conductors from each other, said conductors of each lead being grouped into respective leads at the terminal end of the cable, and means for conducting a coolant over the alternately disposed conductors on both sides of said sheet from one end of the cable.

11. A conductor for transmitting heavy current including in combination, a flexible insulating central core, a pair of leads each composed of a plurality of bare flexible conductors disposed annularly about said core, each conductor of one lead being disposed between a pair of conductors of the other lead, a corrugated sheath of rubber serpentinely disposed when helically wound on said core between and insulating said conductors from each other, an outer flexible insulating sheath encompassing said core and conductors, and means for joining said conductors of each lead into two groups at the end of the cable, one group being bent inwardly toward the axis of the cable while the other group extends annularly thereover.

12. A cable having a pair of leads, each lead embodying a plurality of conductors, means for insulating said leads from each other, a pair of terminals, means for attaching the conductors of one lead which are grouped together centrally of the cable to one of the terminals, and means for connecting the conductors of the other lead which are annularly disposed about said grouped conductors to the other terminal, and means independent of the first said insulating means for insulating said terminals.

13. A cable having a pair of leads, each lead embodying a plurality of conductors, a pair of terminals, means for insulating said terminals from each other, means for attaching the conductors of one lead which are grouped together at one end of the cable to one of the terminals, and means for connecting the conductors of the other lead which are annularly disposed about said grouped conductors to the other terminal, said grouped conductors having a passageway for water on the axis thereof and means in addition to said first insulating means for insulating said leads from each other.

14. A cable having a pair of leads, each lead embodying a plurality of conductors, means for insulating said leads from each other, a pair of terminals, means independent of said first insulating means for insulating said terminals from each other, means for attaching the conductors of one lead which are grouped together centrally of the cable to one of the terminals, means for connecting the conductors of the other lead which are annularly disposed about said grouped conductors to the other terminal, and means for securing said terminals together.

15. A cable having a pair of leads each lead embodying a plurality of conductors, the terminal end of one lead forming a group of conductors about a passageway, the terminal end of the conductors of the other lead being disposed annularly outwardly of said group conductors, a terminal to which said annularly disposed conductors are secured, and a terminal to which the grouped conductors are secured.

16. A cable having a pair of leads each embodying a plurality of conductors which are disposed on the surface of a cylinder, each conductor of one lead being disposed between a pair of conductors of the other lead, an insulating strip sinuously disposed between the conductors to insulate the leads from each other and terminating short of the end thereof, terminals for the ends of the two leads spaced from said insulating strip, a sheath extending over the conductors and terminals, said sheath being sealed to one of the terminals and forming a chamber between the terminals and the insulating strip, one of said terminals having a passageway for a coolant therethrough into said chamber which communicates with all of said conductors on both sides of said sinuously disposed insulating strip.

17. A cable having a pair of leads embodying a pair of conductors with each conductor of one lead being disposed between a pair of conductors of the other lead on the surface of a cylinder, an insulating element sinuously wound between the conductors for insulating them from each other and forming passageways for a coolant thereover, the conductors of one lead being bent inwardly toward the axis of the cable, a terminal to which the bent-in conductors are connected which is spaced from the insulating element to form a chamber, a second terminal joined to the conductors of the other lead which extend over the bent-in conductors, insulating material for insulating said terminals from each other, one of said terminals having a passageway for a coolant into said chamber which is in communication with the passageways about all of the conductors for passing a coolant thereover in the same direction from one end of the cable.

18. A cable having a pair of leads, an inner core, an outer sleeve, each lead being made up of a plurality of conductors disposed on the surface of a cylinder in the space between the core and sleeve, each conductor of one lead being disposed between a pair of conductors of the other lead, an insulating element sinuously disposed between the conductors insulating them from each other while forming passageways thereabout between the sleeve and the core, the conductors of one lead being bent inwardly toward the axis of the cable near one end thereof, a terminal to which the ends of the conductors are connected, a second terminal to which the conductors of the other lead are extended and joined, means for insulating and joining the terminals to each other which are spaced from the core and insulating element and sealed to the sleeve to form a chamber, one of said terminals having a passageway for a coolant communicating with the chamber which is in communication with all of the conductors and the passageways thereabout for passing a coolant in one direction over all the conductors from one end of the cable.

MACKWORTH G. REES.